March 30, 1965  R. C. FISCHER  3,175,344
WHEEL MOUNTING FOR FORAGE HARVESTERS
Original Filed Oct. 8, 1959  3 Sheets-Sheet 1
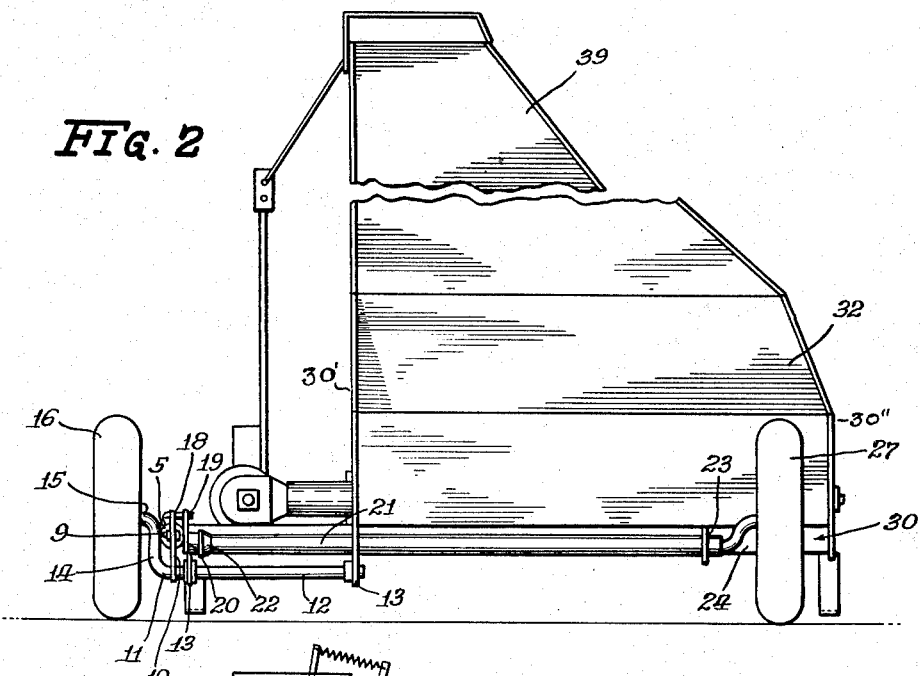
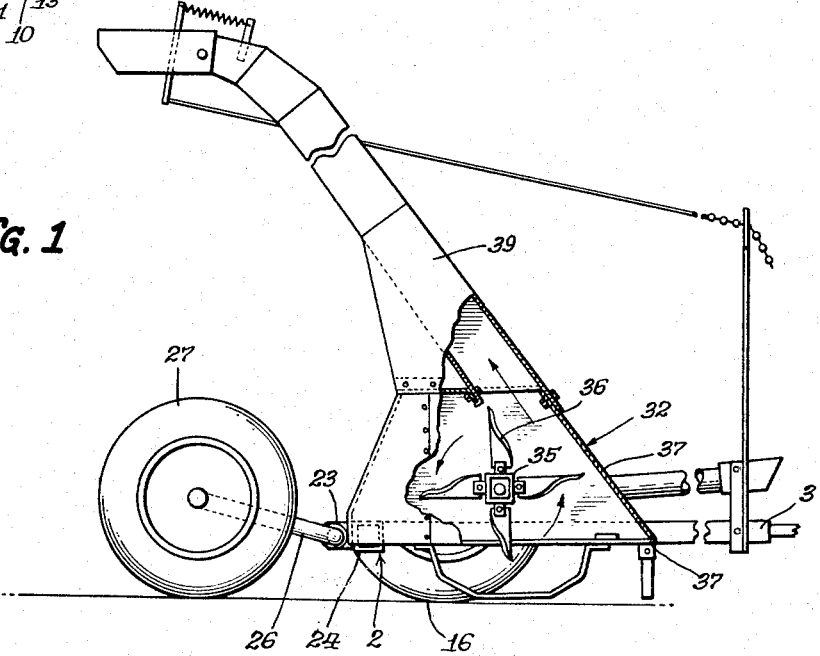
INVENTOR
Raymond C. Fischer
ATTORNEY

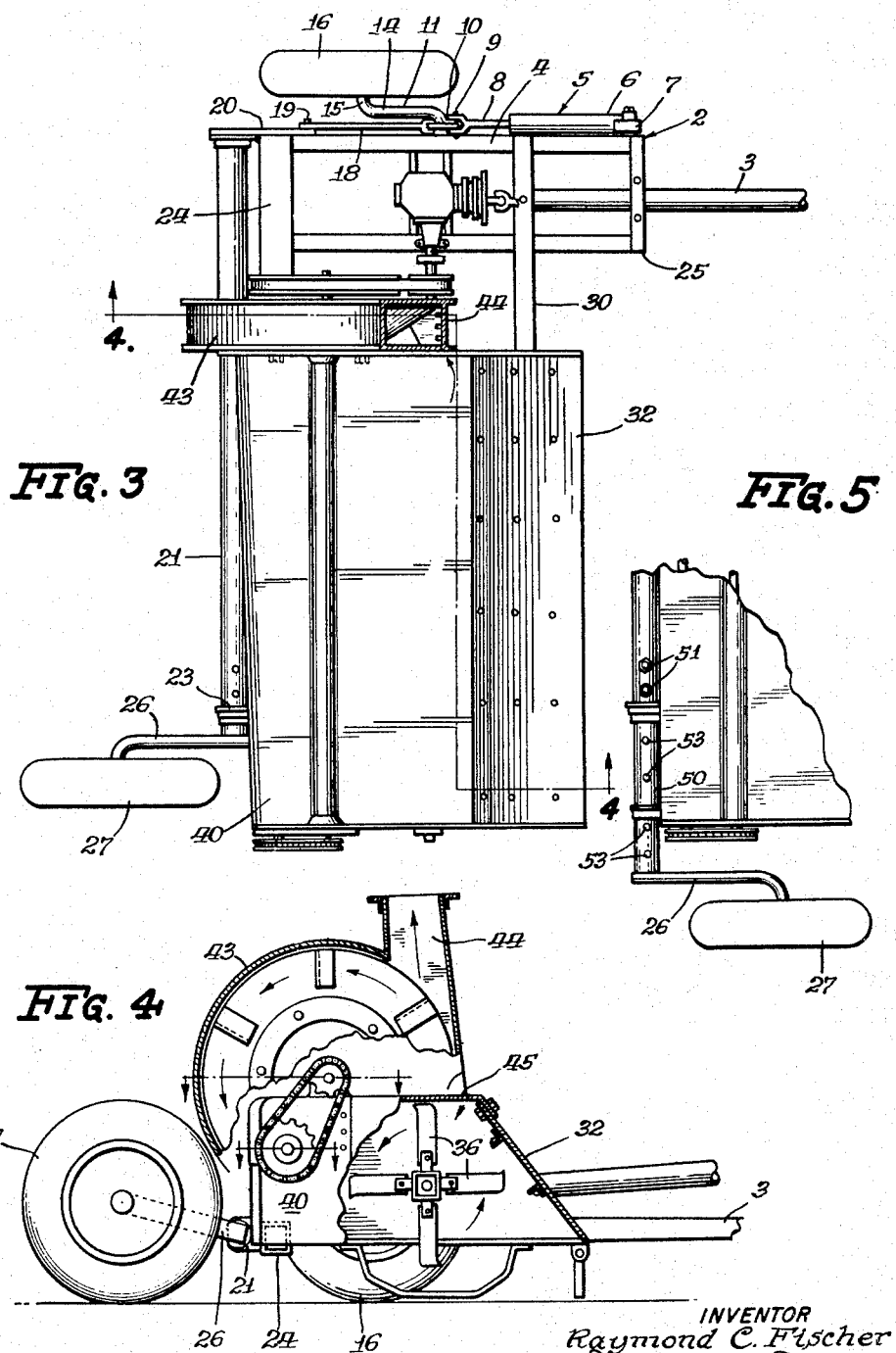

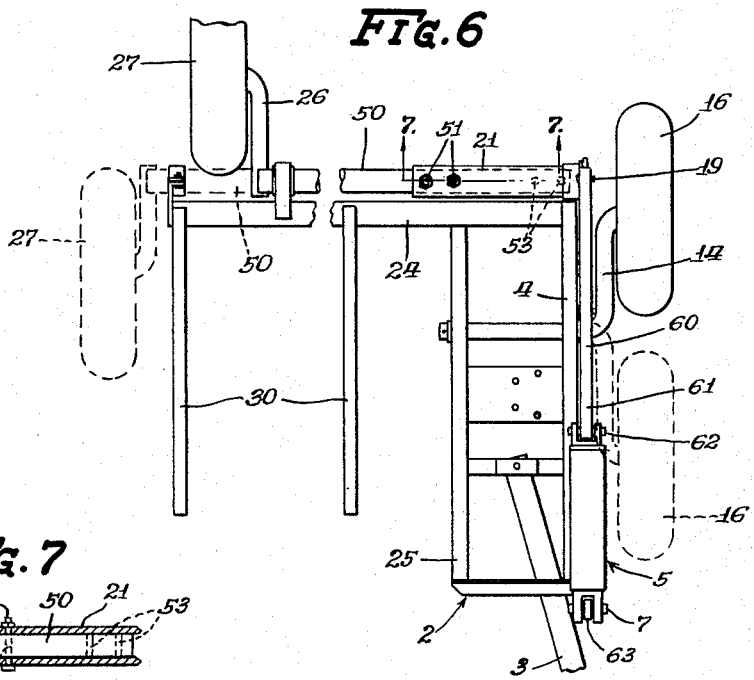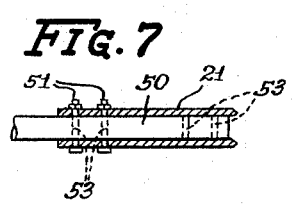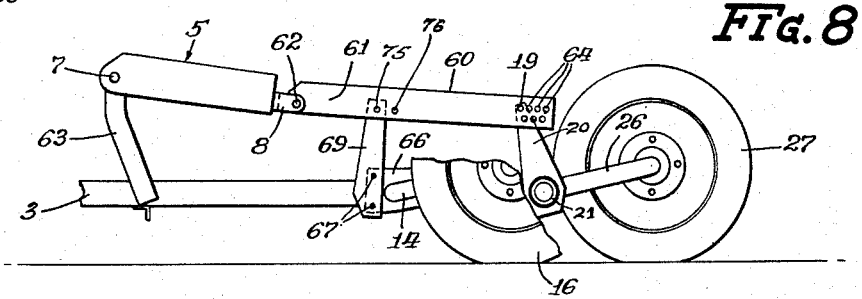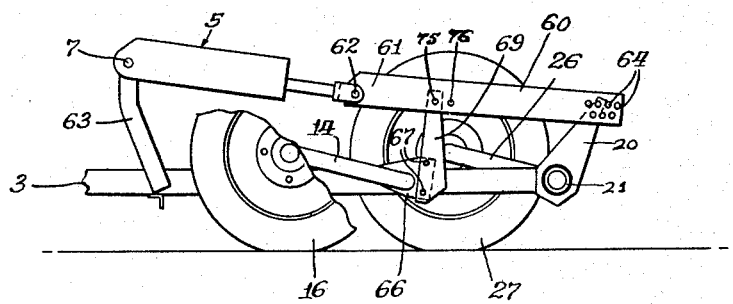

United States Patent Office 3,175,344
Patented Mar. 30, 1965

3,175,344
WHEEL MOUNTING FOR FORAGE HARVESTERS
Raymond C. Fischer, Hinsdale, Ill., assignor to International Harvester Company, Chicago, Ill., a corporation of New Jersey
Continuation of application Ser. No. 845,150, Oct. 8, 1959. This application Jan. 24, 1963, Ser. No. 254,048
11 Claims. (Cl. 56—24)

This invention relates to a novel wheel mounting for forage harvesters of the so-called utility type wherein forage crops are directly cut and conveyed by the rotor from the field and more specifically is a continuation of my U.S. application Serial No. 845,150 filed October 8, 1959, for Wheel Mounting for Forage Harvesters, now abandoned.

A general object of the invention is to provide a novel and efficient wheel mounting for such forage harvester giving particular consideration to the balance of the machine, as well as to the tracking of the wheels so as to prevent running down uncut crops and at the same time adequately supporting the harvester.

A further object of the invention is to devise a novel ground wheel and frame arrangement wherein the stubbleward wheel is located forwardly of the grassward wheel so that the wheels are offset and better gauging is obtained and further wherein the wheels are positionable in different positions transversely of the direction of movement of the unit as well as in the direction of movement of the unit so as to vary the gauging and weight supporting characteristics of the wheel assemblies.

In one embodiment of forage harvesters such as presently under consideration there is provided an auger conveyor rearwardly of the chopper, the conveyor functioning to deliver the material into a blower which in turn discharges the material into a wagon which is drawn along with the harvester.

A difficulty experienced with current designs of such harvesters has been in crowding the grassward wheel close to the auger and it has been a practice to cut off the grassward end of the auger and to accommodate the additional width of the rotor by providing deflectors and the like for shunting the material into the auger. At best this has been only a compromise because from actual tests it has been determined that a considerable amount of material is lost.

An object of the invention is to correct these deficiencies just previously noted by so arranging the wheels that they adequately balance the harvester unit and wherein the wheels may be easily positioned close to the center of the rotor to effect a better gauging for the unit or in offset relationship so as to load the wheel means more advantageously than heretofore feasible in conventional arrangements wherein the wheels are disposed rearwardly of the rotor.

The invention contemplates the provision of a novel arrangement of wheels for a harvesting unit wherein the grassward wheel is positionable alongside the rotor to run over the cut material and hold it down when the swath under the rotor is being gathered. Thus the grassward wheel serves as a novel divider.

These and other objects of the invention will become more apparent from the specification and the drawings, wherein:

FIGURE 1 is a side elevational view partially in vertical section with parts broken away, illustrating one form of harvester with the wheel means in offset relationship;

FIGURE 2 is a rear view with parts broken away of the structure shown in FIGURE 1;

FIGURE 3 is a plan view partially in section, illustrating the wheel mounting as in FIGURES 1 and 2 but in association with another form of harvester;

FIGURE 4 is a fragmentary sectional view taken substantially on the line 4—4 of FIGURE 3 with parts broken away;

FIGURE 5 is a fragmentary plan view illustrating a mounting of the grassward wheel outwardly of the harvester structure;

FIGURES 6 through 9 illustrate a slightly different form of the wheel mounting means in association with the framework, FIGURE 6 being in plan view illustrating alternative mounting in phantom lines;

FIGURE 7 being an enlarged vertical fragmentary sectional view taken substantially on the line 7—7 of FIGURE 6;

FIGURE 8 being a side elevational view with parts broken away, illustrating the wheel mounting shown in solid lines in FIGURE 6; and FIGURE 9 being a side elevational view with parts broken away, showing the wheel mounting of FIGURE 6 as shown in phantom lines.

Describing the invention in detail and having particular reference to the drawings, there is shown an ambulatory frame 2 which has a forwardly extending hitch 3 for connection to an associated towing vehicle such as a tractor, as will be readily understood by those skilled in the art. The frame 3 supports along one side 4 a hydraulic unit in the form of a ram 5 which has its cylinder 6 anchored as at 7 to the frame 2, the cylinder 6 having a piston stem 8 extending rearwardly therefrom, and the stem 8 being pivotally connected as at 9 to intermediate the ends of a lever 10 which is connected at its lower end to a crank-like wheel support 11, the support 11 being suitably journalled on its horizontal shaft portion 12 from bearing means 13 mounted on the frame 2. The shaft portion 12 is connected to an arm portion 14 which at its other end is connected to an outwardly extending shaft portion or spindle 15 which suitably mounts the wheel 16. It will be noted that rotation of the wheel assembly at the shaft portion 12 means of extension and retraction of the ram raises and lowers the supported sides 30', 30" of the framework. The piston is also connected by the lever 10 to the forward end of a rod 18, the rear end of which is pivoted as at 19 to an arm or lever member 20 which is connected to a tube 21 for rotating the latter within the bearing supports 22 and 23 which are secured to a transverse beam member 24 which forms part of the rectangular fore and aft extending frame portion 25 of the framework 2. The other end of the rockshaft structure 21 is connected to a crank 26 which mounts the wheel 27.

The frame portion 30 which is disposed at one side of the frame portion 25 supports the harvester generally designated 32 which in the instance of FIGURES 1 and 2 includes the rotor 35 which has suitable knives 36 formed and arranged to cut the material as it passes under the forward end 37 of a housing 38 and to deliver the material up the discharge chute 39 into a trailing wagon. In the instance of FIGURES 3 and 4 as well as FIGURE 5 it will be seen that the harvester comprises in addition to the housing 37 and the rotor 35 an auger conveyor 40 which is disposed behind the rotor and beneath the top wall 45 of the housing, the auger delivering into a rotor 43 which in turn delivers through the discharge spout 44 into an associated trailing vehicle (not shown) as well understood by those skilled in the art.

It will be seen that the wheel means 16 and 27 in each instance are offset with respect to each other, the wheel 16 being forwardly of the wheel 27 and the wheel 27 being shielded by the rightward end (this end being termed rightward when standing behind the machine looking forwardly) so that any crop which may be to the rightward or grassward side of the machine is not trampled by the wheel. At the same time it will be noted that the effective loading axis of the wheels 16 and 27 is considerably improved over previous structures which feature both wheels rearwardly of the harvester, in that this axis is under the load.

In FIGURES 5, 6 and 7 it will be noted that the extension 50 which is telescoped onto the tube or shaft 21 is extended and that the bolts 51 which secure the shaft portions 50 and 21 are withdrawn from the original holes 53 and inserted into the other holes 53 and the two shaft portions are interconnected in extended positions such that the rightward end of the shaft 50 extends beyond the rightward side of the harvester and that the wheel 27 has been rotated or displaced 180° with respect to its previous position and that it is projected forwardly closer to the rotor. In certain crops this is feasible as in row crops and therefore a flexible arrangement is provided wherein a better support is afforded as well as a gauge for the unit.

Referring now particularly to the structure shown in FIGURES 6 to 9 wherein parts identical with those in the previous embodiment are identified with the same numeral it will be seen that in this instance the only change over the previous structure has been in the relocation of the rod 18 in that the member 60 which corresponds to 18 has its forward end 61 pivoted as at 62 to the piston rod 8 of the ram 5 which is anchored at 7 from the arm 63 which is connected to an adjacent portion of the framework 25. In the showing of FIGURE 8 it will be seen that the leftward wheel means has its crank 14 extending rearwardly and that the crank 26 also extends rearwardly and that to compensate for any sagging which may occur because of the displacement of the rear wheel 27 a greater distance from the center of gravity of the mass of the harvester there are provided a series of adjusting means in the form of holes 64—64 which permit the upper end or lever 20 to be pinned by the pin 19 at various locations fore and aft and to either the upper or lower series of holes in order to provide and obtain coordinated movement between the two wheel supports. The link 60 has an adjustable connection with lever 20.

In the arrangement of FIGURE 9 the same is substantially comparable to FIGURE 8 and in this particular arrangement the wheel means 16 and 27 are displaced 180° with respect to their previous position by having been rotated forwardly about their axes of pivot as represented by 12 and 21. The crank 14 of wheel 16 projects forwardly and its connection by means of the plate structure 66 with the bolts 67 to the lever member 69 is reversed from its position in FIGURE 8 wherein the lever member 69 is forwardly of the plate 66. In the embodiment of FIGURES 6 to 9 the shaft portion 50 is telescoped with respect to the shaft portion 21 and may be extended or contracted as readily seen in FIGURE 7, the bolts 51, 51 being admittable into different holes 53, 53 in accordance with the placement to the wheel and since the two positions are 180° in displacement with respect to one another, the same holes in the outer shaft portion are used with the corresponding holes in the inner shaft. It will be readily noted that in FIGURES 6 and 8 extension of the ram 5 will raise the unit and that in FIGURE 9 contraction of the ram will raise the unit and extension will lower the same.

More specifically, in order to convert from the position of FIGURE 8 to that of FIGURE 9 bolts 67 are removed disconnecting arm 69 from plate 66. The wheel 16 is then rotated about the crank axle 12 (FIGURE 6) until the wheel 16 is placed as seen in FIGURE 9. Plate 66 is reconnected to arm 69 by bolts 67.

Crank portion 50 is disconnected from tube axle 21 by removing bolts 51. The portion 50 is parially withdrawn leftwardly (FIGURE 6) and then wheel 27 is lifted and rotated about portion 50 to the position shown in FIGURE 9 and in phantom lines in FIGURE 6. The portion 50 and tube 21 are reconnected by bolts 51 being reinserted into appropriate openings 53.

It will be appreciated that a novel and simple corrective adjustment is provided for the disadvantage, that is, the weight-carrying disadvantage of the rightward wheel which normally is translated into heavier torsional loading of the axle structure 21 and the extension associated therewith. Thus a novel, efficient and simple wheel mounting arrangement for a harvester has been provided which is simple to manufacture and adjust and efficient in operation.

The upper end of lever 69 is pivoted by pin 75 in either of the two holes 76 in member 60.

What is claimed is:

1. In a crop harvester structure of the type described, a frame, wheel and axle means therefor, said structure having first and second sides spaced transversely of the line of advance of the harvester, a first wheel having a mounting crank disposed along said first side and rotatably mounted on the frame on a transverse generally horizontal axis, and a second wheel having a crank mounted on the frame on a transverse generally horizontal axis disposed adjacent to said second side of the structure, the axes of rotation of said wheels being offset from one another, means including linkage operatively interconnecting said wheels for conjunctive movement, said linkage comprising a pair of lever members operatively connected to the respective wheels, a connecting member pivotally interconnecting said levers, ram means mounted upon said structure and operatively connected to one of said members for actuating the same, and means releasably connecting the cranks of said wheels to respective lever members, said wheels being rotatable with the cranks about their connections to respective lever members to positions to and from in front of and behind the mounting of the cranks to the frame, said releasable connecting means securing the lever members to respective cranks in both positions thereof.

2. In a crop harvester of the type comprising a housing having inboard and outboard sides, a frame supporting the housing, and supporting wheel means mounting said frame and comprising a pair of cranks mounted to the frame for rotation on spaced generally parallel axes extending transversely of said sides, a lever having an operative connection to each of said cranks, means releasably connecting said cranks to the levers so that said cranks may extend forwardly or rearwardly of the respective levers and comprising brackets connected to respective cranks and rotatable therewith and having means positionable for attachment to the respective lever in either position of the associated wheel means, means operatively interconnecting said levers for conjunctive movement, and ram means operatively connected to said levers.

3. In a mounting for a forage harvester of the type comprising an ambulatory structure with a housing, a wheel and axle assembly supporting said structure and including wheels having a first position at opposite sides of the housing in axially and laterally offset relation and having a second position with one of the wheels disposed at one side of the housing rearwardly of its first position and the other wheel having a position behind and intermediate said sides of the housing, each assembly comprising a crank having a part journaled on a substantially horizontal axis to said structure, said part of the crank of the second wheel being axially extensible to clear the wheel with respect to the adjacent side of the housing, and being telescopable to dispose the second wheel in position behind the housing.

4. In a mounting for a forage harvester of the type comprising a housing, a wheel and axle assembly supporting said housing and including wheels having a first position at opposite sides of the housing in axially and laterally offset relation and having a second position with one of the wheels disposed at one side of the housing rearwardly of its first position and the other wheel having a position behind and intermediate said sides of the housing, and each wheel having a crank mounting and operating means for said wheel and axle assembly comprising linkage between crank mountings, means providing selective securement of the linkage to the crank mountings in said first and second positions of the wheels respectively, and comprising parts reversible about the axis of rotation of the respective crank mountings and reattachable in either position of the wheels.

5. In a wheel mounting for a device of the type described, a frame, an axle pivoted thereon, a crank connected to one end of the axle; a wheel on the crank, a second crank pivoted to the frame for swinging movement on an axis generally parallel to the axle, an upright lever connected at its lower end to the axle, a plate connected to the second crank, a lever having a lower end overlapping the plate, bolt and nut means extending through the plate and lever thereagainst, said plate extending radially of the axis of rotation of said second crank and being positionable in leading and trailing directions with respect to the associated lever upon selective positioning the wheel in leading and trailing relation to the axis of rotation of the associated crank.

6. A crop harvester having an axle structure, a wheel assembly having a crank structure with a wheel at one end and means for selectively mounting it to the axle structure in trailing relation to the harvester behind the same and ahead of the axle structure and at selected distances with respect to the adjacent side of the harvester, another wheel assembly at the opposite side of the harvester having crank means selectively positionable with the related wheel in trailing and leading relation, and means operatively connecting the other wheel assembly with the axle structure.

7. The invention according to claim 6 and said connecting means including adjusting means for repositioning with respect to the crank means, said connecting means and to compensate for sagging of the axle structure in either position of said wheel assemblies.

8. The invention according to claim 1 and said operative connection between one wheel and lever member including a rockshaft having a pair of axially telescoping sections positionable in extension with the wheel means outwardly of the associated side and alongside the same.

9. In a crop harvester of the type having a frame structure with first and second sides and an elongated rotary harvesting means mounted upon said structure between said sides transverse to the line of traverse of said harvester, a wheel and axle assembly in supporting relation to the frame structure for gauging the elevation of the rotary means with respect to the ground and tilting and sustaining the rotary means at various lateral inclinations comprising first and second laterally spaced wheels, means mounting said wheels to the structure for vertical swinging movement, one of said wheels disposed through its respective mounting means outwardly of one side of said structure and having a first position in advance of and a second position behind its mounting means, and the other of said wheels selectively disposed through its mounting means in a first position behind the structure adjacent to said opposite side thereof and in a second position ahead of its mounting means outwardly at said second side of said frame structure and adjacent to one end of the rotary means, said other wheel in said second position pressing crops therebeneath against the ground to effect separation thereof from the corps being gathered by the rotary means.

10. The invention according to claim 9 and said mounting means comprising a crank axle connection for each wheel to the frame structure, a lever connected to each crank axle, a ram connected between one lever and the frame structure, a connector pivotally connected to one lever, and means providing an adjustable connection between the other lever and the connector for varying the spacing between said levers and thereby varying the angular displacement between said wheel means about a transverse axis.

11. In a harvester having a frame, rotary gathering means carried therefrom and wheel means supporting the frame and including a pair of wheels, said wheel means having a position wherein one of the wheels is alongside the rotary gathering means and rolls over cut material alongside the harvester for separating the material on the grassward side of the wheel from that beneath the rotary means to prevent pulling material endwise under the rotary means from the grassward side of the wheel, said wheels being disposed in fore and aft offset relationship, and means interconnecting said wheels for vertical movement to elevate and lower said harvester.

References Cited by the Examiner
UNITED STATES PATENTS

| | | | |
|---|---|---|---|
| 2,208,526 | 7/40 | Gurries | 280—34 X |
| 2,669,818 | 2/54 | Pursche | 172—413 X |
| 2,818,269 | 12/57 | Northcote et al. | 56—25.4 X |
| 2,947,129 | 8/60 | Kowalik. | |

FOREIGN PATENTS 1,208,357  9/59  France.

T. GRAHAM CRAVER, *Primary Examiner.*

ANTONIO F. GUIDA, ARNOLD RUEGG, *Examiners.*